United States Patent
Parsons et al.

(10) Patent No.: US 10,892,826 B2
(45) Date of Patent: Jan. 12, 2021

(54) LOOSE OPTICAL FIBER TETHERING OF MULTIPLE SATELLITES

(71) Applicant: Mitsubishi Electric Research Laboratories, Inc., Cambridge, MA (US)

(72) Inventors: Kieran Parsons, Cambridge, MA (US); Avishai Weiss, Cambridge, MA (US); Philip Orlik, Cambridge, MA (US); Stefano Di Cairano, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 16/366,060

(22) Filed: Mar. 27, 2019

(65) Prior Publication Data
US 2020/0313770 A1 Oct. 1, 2020

(51) Int. Cl.
*H04B 10/25* (2013.01)
*H04B 7/0408* (2017.01)
*H04B 10/2575* (2013.01)

(52) U.S. Cl.
CPC .......... *H04B 10/25* (2013.01); *H04B 7/0408* (2013.01); *H04B 10/25752* (2013.01)

(58) Field of Classification Search
CPC ............... H04B 10/225; H04B 7/0408; H04B 10/25752
See application file for complete search history.

(56) References Cited

U.S. PATENT DOCUMENTS

| | | | |
|---|---|---|---|
| 6,173,922 B1 * | 1/2001 | Hoyt | B64G 1/64 244/150 |
| 2007/0045474 A1 * | 3/2007 | Bae | F03H 3/00 244/171.1 |

(Continued)

FOREIGN PATENT DOCUMENTS

JP 04072000 A * 3/1992

OTHER PUBLICATIONS

Hatsuda et al, Optical Fiber Geostationary Tether Satellite (F-GTS) System Design, Oct. 1997, IEEE Transactions on Aerospace and Electronic Systems, vol. 33, No. 4 pp. 1235-1241.*

*Primary Examiner* — Leslie C Pascal
(74) *Attorney, Agent, or Firm* — Gennadiy Vinokur; James McAleenan; Hironori Tsukamoto

(57) ABSTRACT

A multi-satellite system includes a first satellite and a second satellite configured to be separated in a predetermined distance between the satellites after being launched into space, and a tether including an optical fiber having first and second ends, wherein the first end is connected to the first satellite and the second end is connected to the second satellite, wherein a length of the tether is greater than the predetermined distance. In this case, the first satellite includes an optical transceiver connected to the first end of the optical fiber to provide a communications link to the second satellite, a spool containing partial winding of the tether, and a free space optical transceiver to provide a first communications link to a first distant satellite. Further, the second satellite includes an optical transceiver connected to the second end of the optical fiber to provide the communications link to the first satellite, and a spool containing partial winding of the tether, and a free space optical transceiver to provide a second communications link to a second distant satellite.

16 Claims, 9 Drawing Sheets

(56) References Cited

U.S. PATENT DOCUMENTS

2013/0115544 A1* 5/2013 Davidson ............. H02K 7/1807
                                                        429/505
2018/0367216 A1* 12/2018 Welle ..................... H04B 10/40
2019/0296425 A1* 9/2019 Greenbaum ........... H01Q 21/22

* cited by examiner

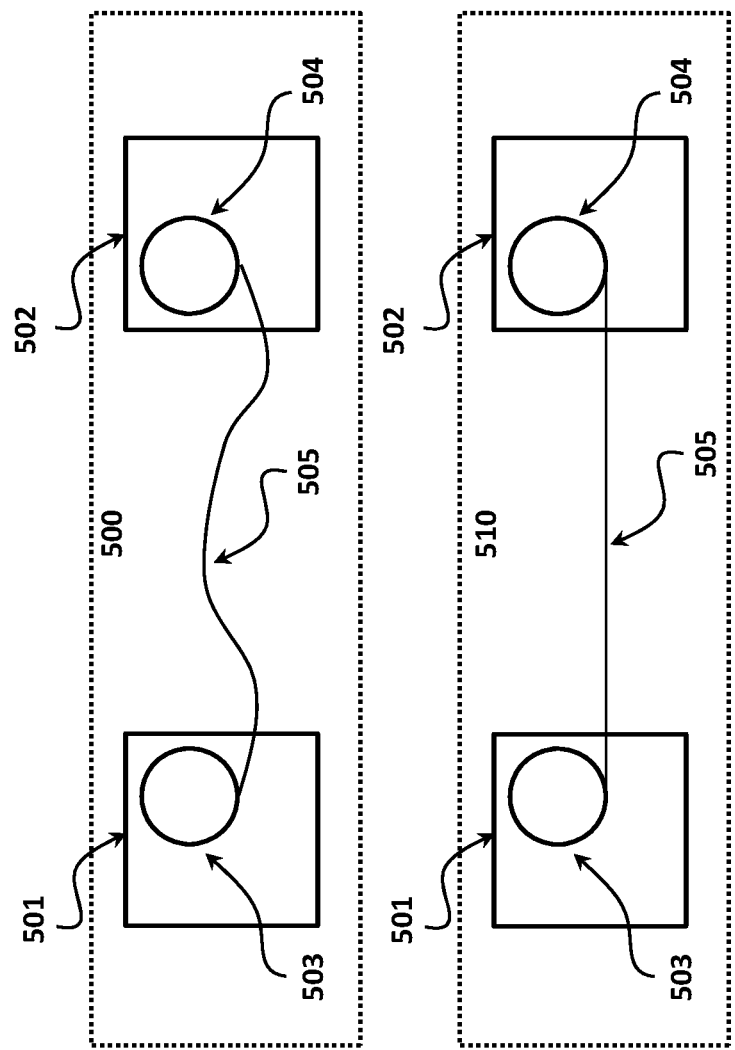

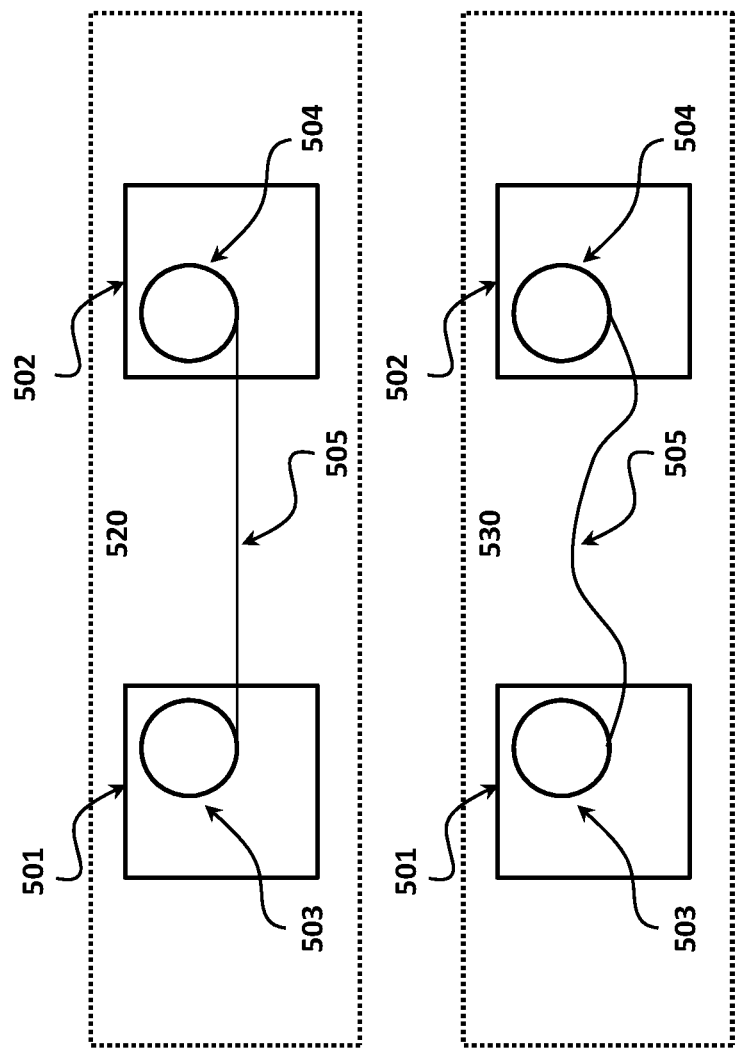

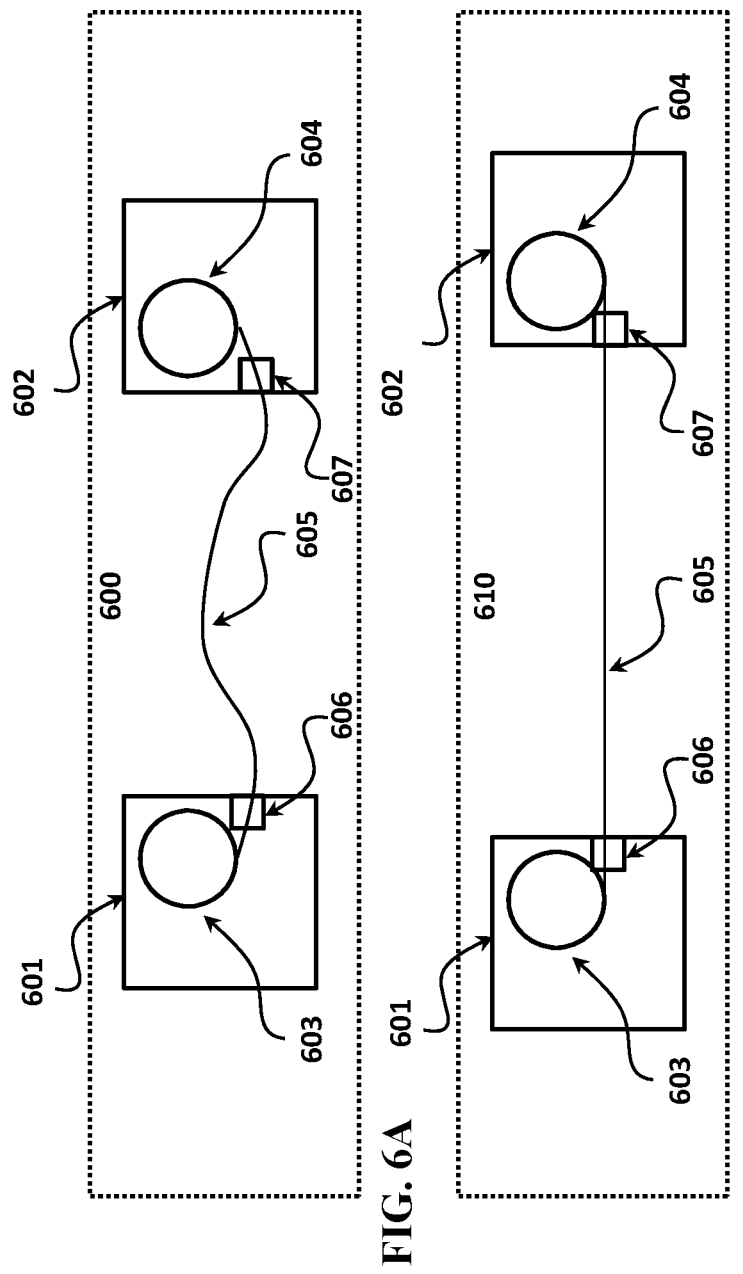

LOOSE OPTICAL FIBER TETHERING OF MULTIPLE SATELLITES

TECHNICAL FIELD

This invention relates generally to optical communications, and in particular use of a loose optical fiber to support communications between satellites.

BACKGROUND

The communication between satellites or between a satellite and the ground radio frequency (RF) links requires high data rate digital communication. More recently, to achieve much higher data rates free-space optical (FSO) links are starting to be used. To support the FSO link the transmitters and receivers must be very closely aligned due to the very narrow beamwidth of the communication path to allow reliable communication.

Typical methods to coarsely achieve this alignment ability include satellite body rotation or 1-axis or 2-axis gimbals to rotate the transceiver (TRx) optics, often a telescope, independently of the satellite body, with fine alignment adjustment using a fine steering mechanism (FSM) such as a nutating fiber or MEMS mirror. The former methods (satellite body or 1 axis gimbal) only allow pointing of a single independent beam and so are not suitable for communication between several satellites (for example, crosslinks in a constellation, or a swarm of satellites). The latter method (2-axis gimbal) is commonly used in large satellites, but its size, weight and precise manufacture make its use in small satellites (including cubesats) prohibitive.

One method known in the art to allow for independent pointing of multiple FSO beams is to use separate closely-spaced satellites where each satellite supports a single FSO beam aligned using body pointing, with omni-directional RF links or wide-beam free-space optical links between the satellites to provide full communication ability. One major issue with this method is that the omni-directional RF link or wide-beam free-space optical link can be a bottleneck which limits the available datarate.

Accordingly, there is a need to solve the issues above for providing higher data communications between satellites.

SUMMARY

The present invention provides a loose optical fiber tethering technique that enables high data rate free-space optical (FSO) communications between satellites, while current systems use body-steering or 1-axis gimbals, which are restricted to a single independent FSO beam, or 2-axis gimbals, which are large, heavy and require precise manufacture. Some embodiments of the present invention can provide a multi-satellite system comprising of closely spaced satellites with a single FSO beam per satellite connected via a loose optical fiber tether to allow multiple simultaneous communications paths. The fact that the tether is "loose" ensures that the inevitable movement of one satellite does not affect the others, which would cause a severe degradation in communication reliability due to the narrow beam-width of the FSO link.

According to some embodiments of the present invention, a multi-satellite system includes a first satellite and a second satellite configured to be separated in a predetermined distance between the satellites after being launched into space; and a tether including an optical fiber having first and second ends, wherein the first end is connected to the first satellite and the second end is connected to the second satellite, wherein a length of the tether is greater than the predetermined distance. In this case the first satellite includes an optical transceiver 121 (FIG. 1A) connected to the first end of the optical fiber to provide a communications link to the second satellite, a spool containing partial winding of the tether, and a free space optical transceiver 122 and one-axis gimbal 123 (FIG. 1A) to provide a first communications link to a first distant satellite or a ground station, wherein the second satellite includes an optical transceiver 131 (FIG. 1A) connected to the second end of the optical fiber to provide the communications link to the first satellite, and a spool containing partial winding of the tether, and a free space optical transceiver 132 and one-axis gimbal 133 (FIG. 1A) to provide a second communications link to a second distant satellite or a ground station.

This invention addresses the problem of providing independently-steered very high data rate communication links between satellites without the need for 2-axis gimbals by using a multi-satellite system comprising two or more closely spaced satellites (which rotate independently to steer the free-space optical beams) which are tethered with a loose optical fiber. The optical fiber supports much higher data rate than the omni-directional RF link or wide-beam free-space optical link known in the art. The tether differs from those in the art by being "loose" (or "slack"), meaning that movement of one of the satellites does not cause movement of any of the others. This allows the FSO beams to maintain their steering angle accurately. In contrast, use of a traditional taut tether would result in the inevitable movement of one satellite causing the FSO link of others to be perturbed and so lose connectivity, or have significantly reduced performance.

An additional benefit of the loose tether concept is that it is not limited to optical fiber tethers. Using an electrical cable tether would also allow electrical power transfer from one satellite to another (for example, if one has excess power available at a particular time or due to an increased level of solar radiation or solar cells). This would also need to be a loose tether to ensure that the satellites' rotations and FSO beam directions are unaffected.

Another additional benefit is that the tether can be used to help keep the satellites closely spaced by periodic wind-up and release of the tether (during a maintenance window, since the FSO communications path will be affected).

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIGS. 5A, 5B, 5C and 5D show tension maintenance stages according to some embodiments of the invention; and FIGS. 6A and 6B show tension measurement stages according to some embodiments of the invention.

Figure 1A:
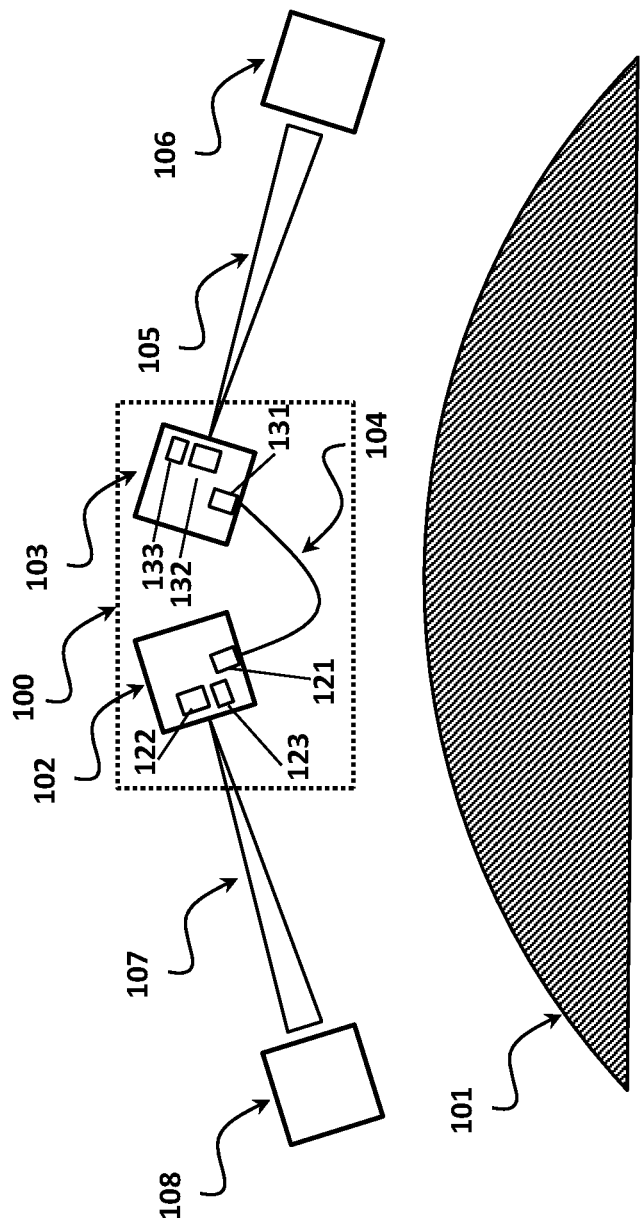
FIGS. 1A and 1B are schematics illustrating loose tethering between satellites according to some embodiments of the invention.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

FIG. 1A shows a multi-satellite system 100 comprising two satellites 102 and 103 connected via a loose optical fiber tether 104 in an open or closed orbital path around, between, or near one or more gravitational bodies such as the Earth 101, moon, and/or other celestial bodies. Satellite 102 has a free space optical (FSO) communication link 107 using a free space optical beam pointing to a distant satellite 108 which can be either in the same (identical) orbit with that of satellites 102 and/or 103 or a different orbit from that of satellites 102 and/or 103.

For instance, the loose optical fiber tether 104 may be formed of an optical fiber with a support material. The support material may include a steel or copper wire or a resilient acrylic yarn or polymer material that covers an optical fiber (or optical fibers) to achieve the long-term damping and stability. The optical fiber itself used in the optical tether 104 may be a single mode fiber, a multi-mode fiber or a fiber specially doped to reduce the impact of radiation in space (such as a fluorine-doped core optical fiber). The free space optical communication links 105 and 107 use light generated from a laser or LED source at the transmitter that is tightly focused using an optical telescope or other means into an optical beam. The optical signal is modulated to impart the information of the desired data to be transferred. The modulation of the light can be in terms of amplitude, phase, frequency, spatial mode or other methods known in the art. Typical wavelengths for free space optical links in space include approximately 1064 nm or 1550 nm, although other wavelengths may also be used. The optical signal is received at the end of the link using an optical telescope or other means and an optical receiver to detect and decode the data. The optical receiver may be direct detection or a coherent receiver.

Similarly, satellite 103 has an FSO link 105 to a distant satellite 106. The optical fiber tether 104 supports a unidirectional or bidirectional high data rate communications link between 102 and 103. A full unidirectional or bidirectional high data rate communications link is therefore created between satellites 106, 103, 102 and 108, supporting long distance high rate communications.

The FSO links 105 and 107 are highly directional in order to support high data rates at long distance and so the link orientations are required to be accurately maintained. The distant satellites 106 and 108 may be in the same orbits as 102 and 103 or in different orbits. Additionally, the satellites are subject to various disturbance forces that will change the direction of the FSO links 105 and 107. In both cases it is required that the direction of the FSO link is regularly adjusted in order to maintain a high degree of pointing accuracy and so high data rate transmission. This can be achieved via body pointing of the satellite or other methods known in the art.

Satellites 102 and 103 are maintained to be sufficiently closely spaced such that the optical tether 104 remains loose in normal operation. In this way, the pointing direction of either satellite can be independently adjusted without affecting the other. Similarly any disturbance of one satellite is not transferred to the other. If the optical tether was instead taut, any disturbance or adjustment of the orientation of one satellite 102 or 103 would directly affect the other 103 or 102 causing a reduction in performance of the FSO link 105 or 107.

Figure 1B:
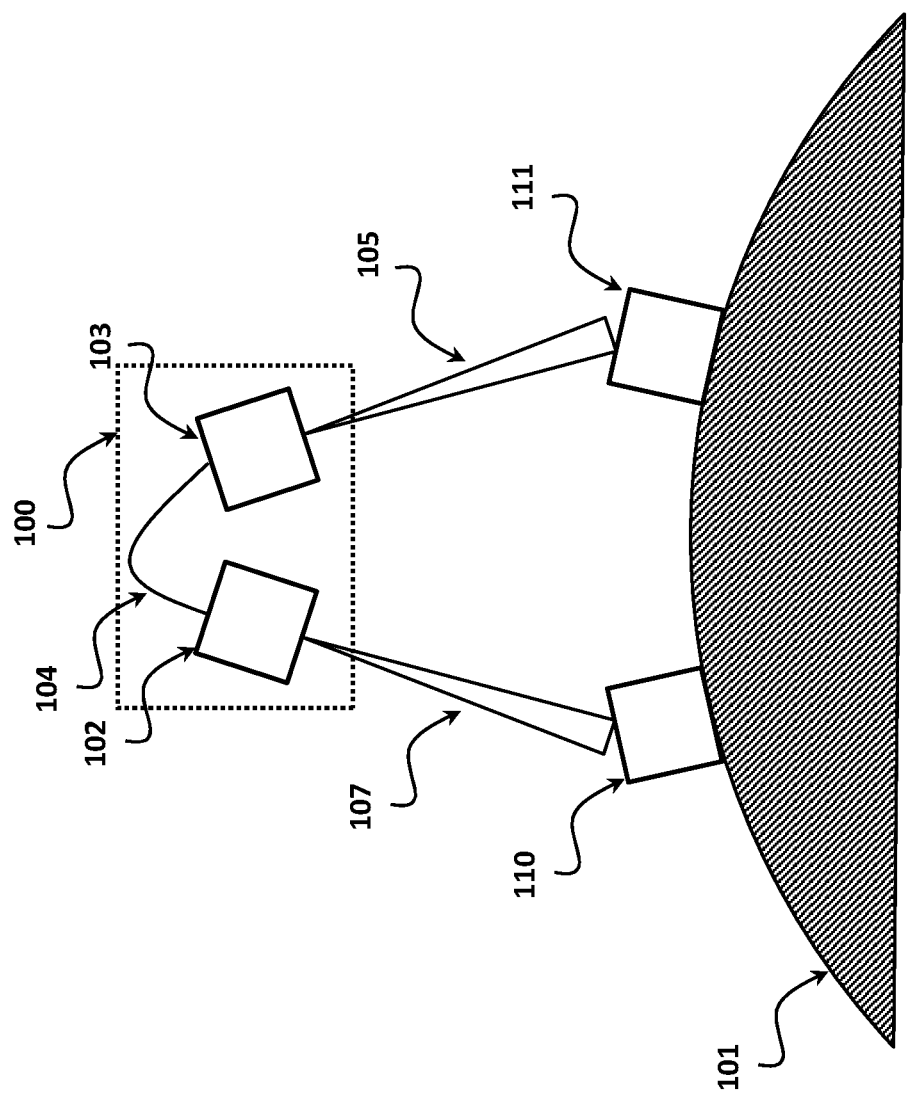

FIG. 1B shows an alternate configuration where the closely spaced satellites 102 and 103 within the multi-satellite system 100 are pointed to ground based stations (ground stations) 110 and 111 via the FSO links 105 and 107. This configuration supports a high data rate unidirectional or bidirectional link between 110, 102, 103 and 111. As the satellites 102 and 103 travel in their orbits the direction of the FSO links 105 and 107 is adjusted, via body pointing or other method known in the art, to maintain the high link data rate, in a similar way as described in FIG. 1A.

Figure 2A:
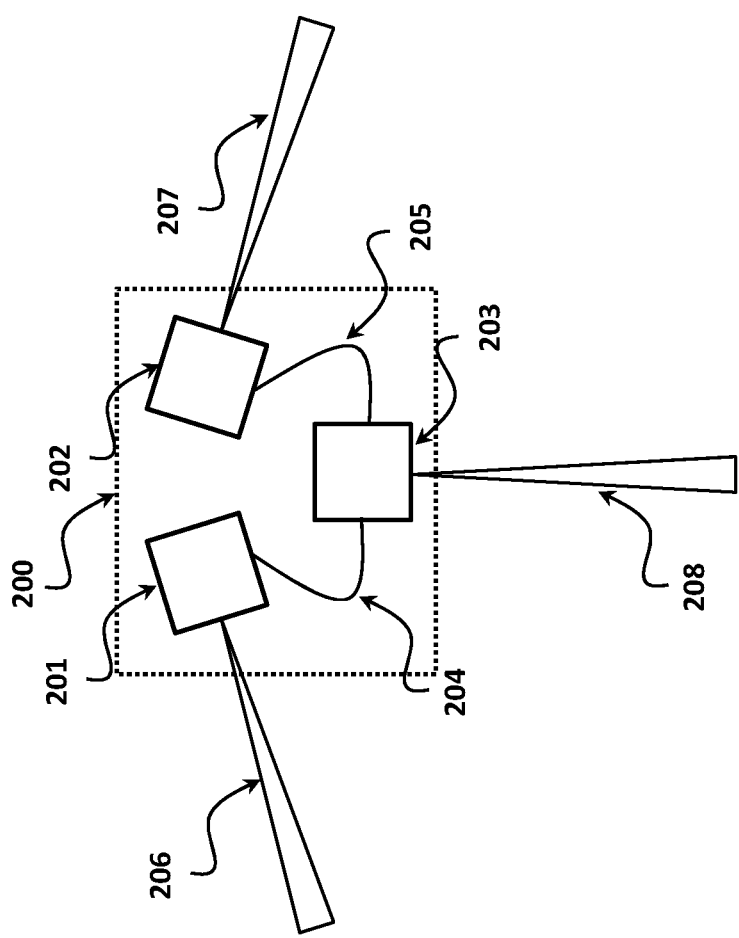
FIGS. 2A and 2B are configuration schematics for loose tethering between more than 2 satellites according to some embodiments of the invention.

FIG. 2A shows a multi-satellite system 200 comprising three closely spaced satellites 201, 202, 203 which support three independent direction FSO links. The satellites are connected via loose optical fiber tethers 204 and 205. In this way, high data rate communication is maintained between 201, 202, 203 and the satellites/stations at the far end of the FSO links 206, 207, 208.

Figure 2B:
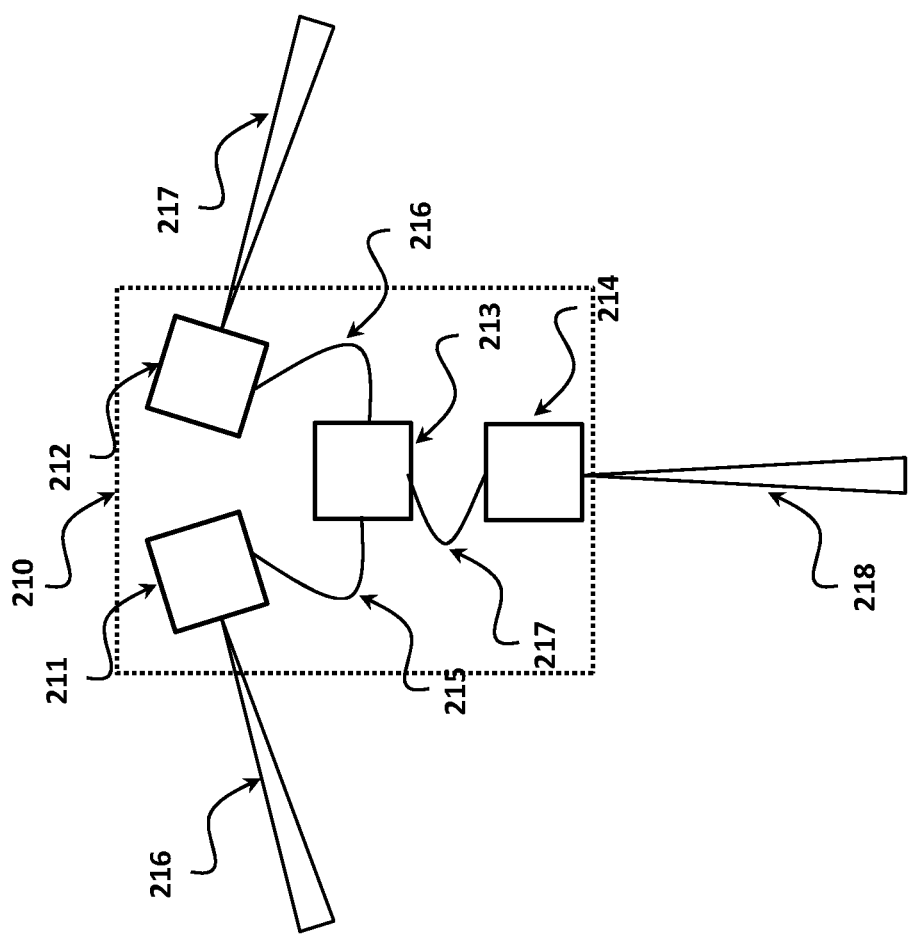

FIG. 2B shows a multi-satellite system 210 comprising four closely spaced satellites 211, 212, 213, 214 connected via 3 loose optical fiber tethers 215, 216, 217 and supporting three independent FSO links 216, 217, 218. FIGS. 2A and 2B show example configurations, other configurations in similar fashion are also contemplated. This disclosure presents illustrative embodiments by way of representation and not limitation. Numerous other modifications and embodiments can be devised by those skilled in the art which fall within the scope and spirit of the principles of the presently disclosed embodiments.

Figure 3:
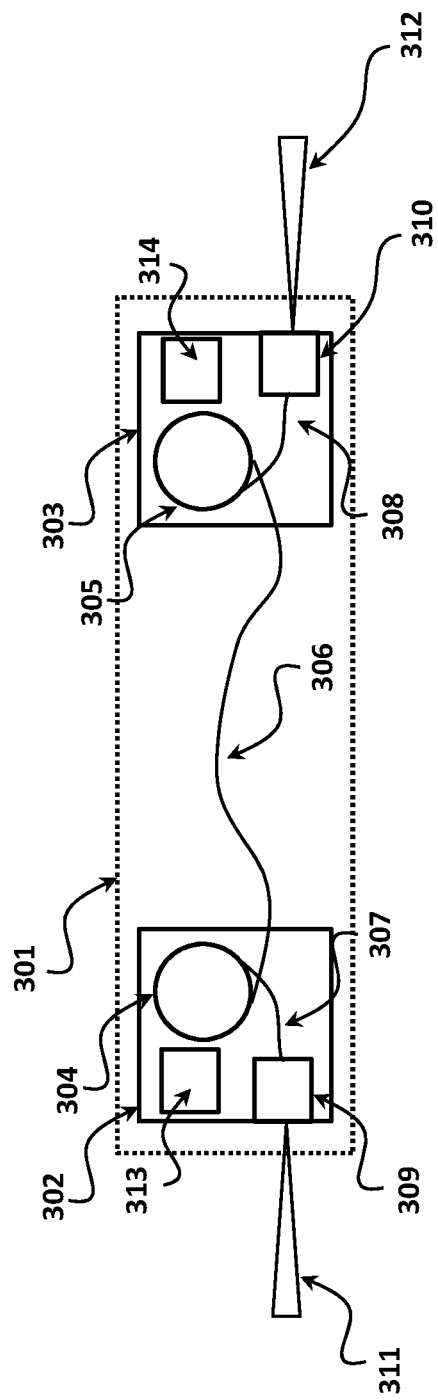
FIG. 3 shows configuration schematics of the communications-related sub-assemblies and communications links according to some embodiments of the invention.

FIG. 3 shows a configuration schematic illustrating the communications-related sub-assemblies and communications-related links. The multi-satellite system 301 comprising two satellites 302 and 303 connected via a loose optical fiber tether 306. The optical fiber tether is partially wound on winding spools 304 and 305 in each satellite where the length of the optical fiber tether in each satellite need not be the same. One end of the optical tether 307 is connected to a free space optical module 309 to allow bi-directional data transfer to a distant satellite via the free space optical beam 311. Similarly, the other end of the optical tether 308 is connected to a free space optical module 310 to allow bi-directional data transfer to a distant satellite via the free space optical beam 312. To avoid tether tangling during any rotation of the winding spools an optical fiber slip-ring or other method known in the art is used.

To alter the orientation of the free space optical beam 311 on the first satellite 302, an Attitude Control System (ACS) 313 may be used. Similarly, to alter the orientation of the free space optical beam 312 on the second satellite 303, an Attitude Control System (ACS) 314 may be used. Additional fine adjustment of the optical beam orientation may be performed using one-axis gimbals as part of the free space optical modules 309 and 310. The loose nature of the optical tether 306 ensures that the effects of the ACS and/or one-axis gimbal on the first satellite 302 does not affect the orientation of the free space optical beam 312 on the second satellite 303, and vice versa.

The optical fiber tether 306 may include strength members to make the tether more robust albeit heavily and bulkier. The fiber tether 306 may include one or multiple optical fibers and may also include electrical cables for powering or additional signaling purposes.

Figure 4A:
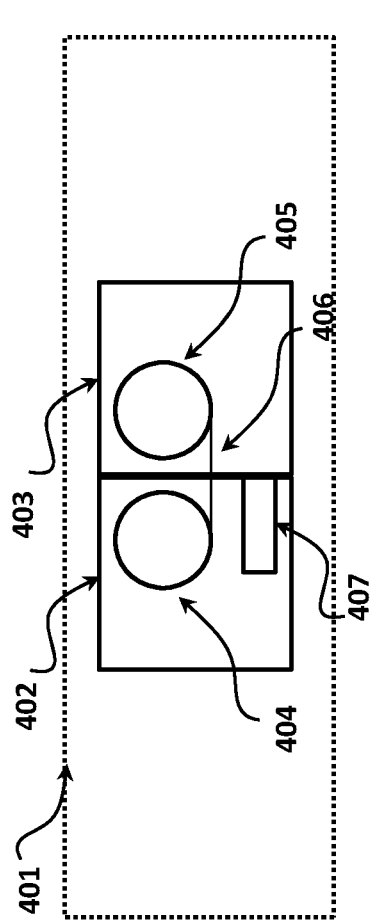
FIGS. 4A, 4B and 4C show satellite deployment stages according to some embodiments of the invention.
Figure 4B:
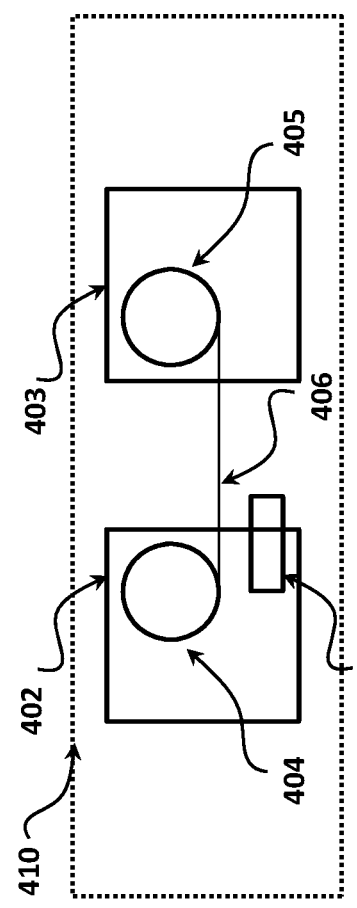
Figure 4C:
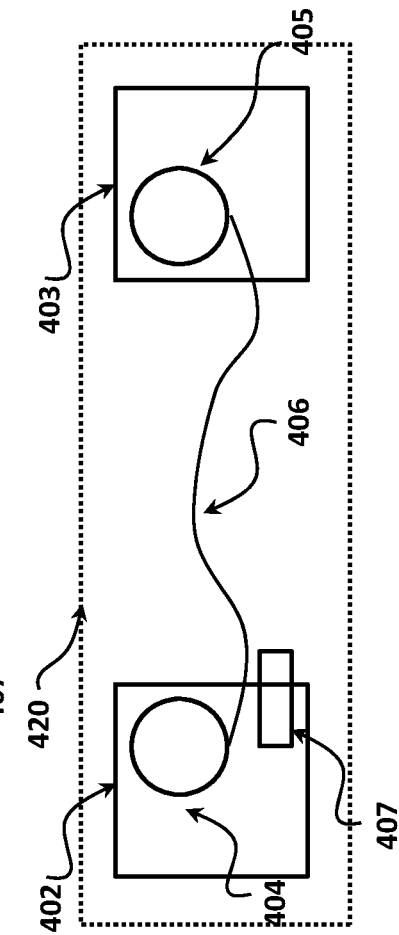

FIGS. 4A, 4B and 4C show several stages of deployment of the satellites. FIG. 4A shows a launch configuration 401 in which the two satellites 402 and 403 are connected together by the latch/release mechanism 407. The optical tether 406 is wound onto winding spools 404 and 405 on each satellite. The ratio of optical fiber on each satellite can be controlled at design or manufacture depending on needs, and can be as low as zero on one satellite with all fiber on the other.

After launch and placement in orbit, the initial deployment stage 410 is started as illustrated in FIG. 4B. The latch/release mechanism 407 is set to release mode and the two satellites 402 and 403 are forced apart at low speed. The separation force is provided either by the release mechanism 407 itself or other methods known in the art, such as thrusters. The optical fiber 406 is continually unwound from the winding spools 404 and 405 as the satellites 402 and 403 separate. Once the desired separation has been reached the relative satellite motion is stopped, either by stopping the deployment of fiber and letting the tether become taut, or by supplying force from thrusters. FIG. 4C illustrates the final deployment stage 420 in which the optical tether is unwound further to ensure that it is loose so that normal operation of communications via FSO links may be supported. The amount of extra unwinding is sufficient so that the optical tether does not become taut during normal operation conditions with anticipated amounts of satellite disturbances and body pointing adjustments.

FIGS. 5A, 5B, 5C and 5D show stages of tension maintenance. FIG. 5A illustrates in normal operation 500 in which the tether 505 is loose. However, due to the various disturbance forces on the two satellites 501 and 502 they will drift apart and so eventually the tether 505 would become taut, as it is of finite length. Once the tether becomes taut, the movement of one satellite will affect the other and so the FSO links will be degraded. Before this occurs, the distance between the satellites is reduced by use of the tether. This process is performed in a maintenance window, since high performance of the FSO links cannot be guaranteed. In stage 510 shown in FIG. 5B, the tether 505 is wound back onto spools 503 and 504 via motors (not shown) and so becomes taut. In stage 520 as shown in FIG. 5C, the tether 505 continues to be wound onto spools 503 and 504 and so reduces the distance between the satellites 501 and 502. This winding continues until the desired satellite separation is achieved. In stage 530 the optical tether is unwound such that the tether becomes loose, allowing for normal operation of communications via FSO links, as shown in FIG. 5D.

An alternative method of tension maintenance uses thrusters for conventional orbital adjustments, or station keeping, of satellites 501 and 502 to maintain the satellite spacing such that the optical tether does not become taut. Another method may make use of differential drag on satellites 501 and 502. When in low Earth orbit (LEO), air resistance provides a force on a satellite, affecting its orbital trajectory. If the satellites 501 and 502 are in (slightly) different orbits, or have different (or expose different) cross-sectional areas to their travelling velocity direction, they will experience different amounts of drag and thus get closer to or farther apart from each other, thereby enabling control over satellite spacing and the tautness of the optical tether between them. This does not necessarily require a maintenance window and so normal operation can be maintained at all times.

FIGS. 6A and 6B show stages of tension measurement. In normal operation 600 the tether 605 is loose and so the tension measurement devices 606 and 607 (using tension measurement methods known in the art) measure zero or predetermined acceptable amounts of tension in the tether. As the satellites drift apart 610, the tether becomes less loose and so the tension measured by the tension measurement devices 606 and 607 will increase. Once a tension threshold has been passed (or preemptively during a maintenance window) the tension maintenance method described above is performed to ensure normal operation can be maintained.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as first, second, in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A multi-satellite system comprising:
   a first satellite and a second satellite configured to be separated in a predetermined distance between the satellites after being launched into space; and
   a tether including an optical fiber having first and second ends, wherein the first end is connected to the first satellite and the second end is connected to the second satellite, wherein a length of the tether is greater than the predetermined distance, wherein the movement of one of the satellites does not cause movement of other satellites,
   wherein the first satellite comprises:
      an optical transceiver connected to the first end of the optical fiber to provide a communications link to the second satellite,
      a spool containing partial winding of the tether, and
      a free space optical transceiver to provide a first communications link to a first distant satellite,
   wherein the second satellite comprises:
      an optical transceiver connected to the second end of the optical fiber to provide the communications link to the first satellite, and
      a spool containing partial winding of the tether, and
      a free space optical transceiver to provide a second communications link to a second distant satellite.

2. The system of claim 1, wherein the first and second satellites respectively comprise an Attitude Control System (ACS) configured to alter orientations of the satellites to point free space optical beams of the first and second satellites toward the first and second distant satellites.

3. The system of claim 1, wherein the first and second satellites comprise Attitude Control Systems (ACSs) and one-axis gimbals, wherein the ACSs and the one-axis gimbals are configured to alter orientations of the satellites to point free space optical beams from (or of) the first and second satellites towards the first and second distant satellites.

4. The system of claim 1, wherein the first and second satellites include latch/release mechanisms configured to separate the first and second satellites when the system reaches in a predetermined orbit.

5. The system of claim 1, wherein at least one of the first and second satellites comprises a tension measurement device configured to measure a tension of the tether.

6. The system of claim 5, wherein when the system is in a low earth orbit, the predetermined distance between the satellites is adjusted via differential drag or orbital maneuvering.

7. The system of claim 1, wherein at least one of the first and second satellites comprises a tension measurement device configured to measure a tension of the tether and a spool winding device configured to shorten or lengthen the tether.

8. The system of claim 7, wherein the predetermined distance between the satellites is adjusted by winding up or releasing the tether using the spool winding device.

9. The system of claim 1, wherein the tether includes an electrical cable.

10. The system of claim 1, wherein the tether includes a strength member.

11. The system of claim 1, wherein the first and second distant satellites are in an identical orbit.

12. The system of claim 1, wherein the first and second distant satellites and the first and second satellites are in an identical orbit, and the first and second satellites are arranged between the first and second distant satellites.

13. The system of claim 1, wherein the first and second distant satellites and the first and second satellites are in an identical orbit, and the first and second distant satellites are at different inclinations.

14. The system of claim 1, wherein an orbit of at least one of the first and second distant satellites is different from orbits of the first and second satellites.

15. The system of claim 1, wherein at least one of the free space optical transceivers of the first and second satellites is configured to communicate with a ground station.

16. The system of claim 1, wherein the system includes more than two satellites and more than two tethers configured to connect the more than two satellites.

* * * * *